April 18, 1967
A. M. CAMBRIDGE
3,314,413
FLAMELESS COOKING APPARATUS AND COMPOUND
Filed March 9, 1965
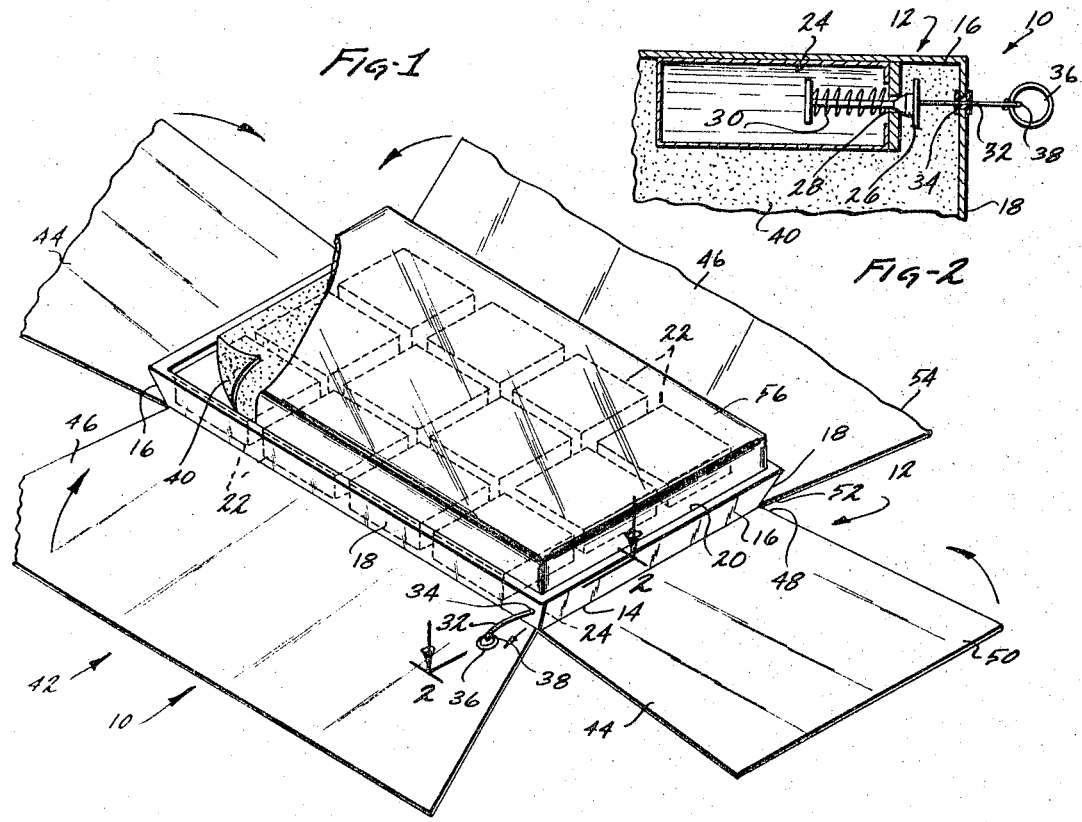
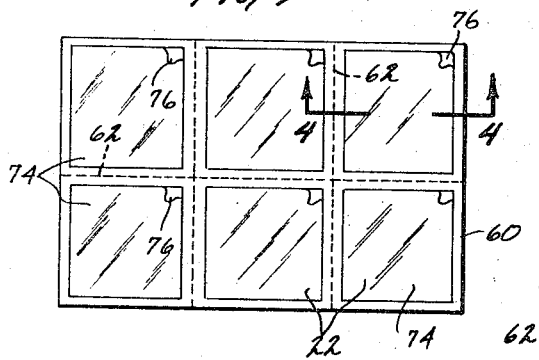
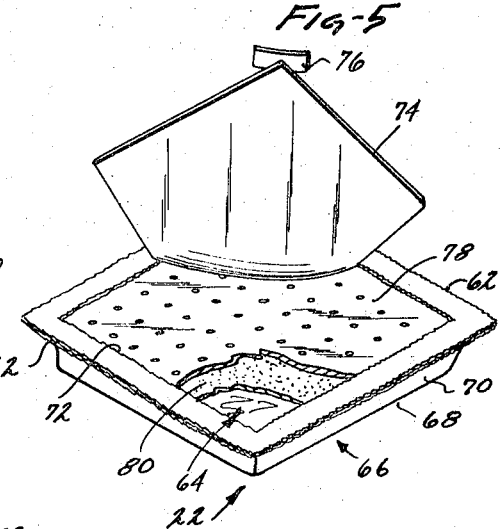
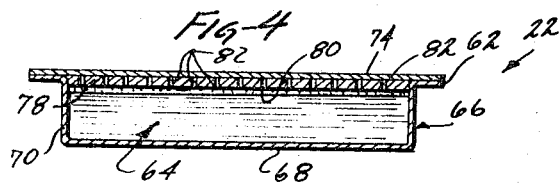
INVENTOR.
ARNOLD M. CAMBRIDGE
BY
*Herzig & Walsh*
ATTORNEYS

3,314,413
FLAMELESS COOKING APPARATUS AND COMPOUND
Arnold M. Cambridge, 522 N. Canon Drive, Beverly Hills, Calif. 90210
Filed Mar. 9, 1965, Ser. No. 438,232
4 Claims. (Cl. 126—263)

This invention relates to a new and useful flameless cooking apparatus and compound and more particularly to an arrangement for cooking foods in a container of the invention with a liquid-actuated, heat-generating compound of the invention.

A number of prior art devices are available for heating the contents of a sealed can chemically by causing water to re-act exothermically with unslaked lime. Most of these prior art devices employ a cylindrical container having an outer wall and an inner wall between which the lime is placed in fluid communication with the water. The sealed can to be heated is then placed inside the inner wall so that the contents thereof will become heated when the water is released onto the lime. In some cases, the can containing the food to be heated is sealed to the container containing the lime and water forming a single structure which is disposed of after use.

While generally satisfactory, these prior art devices for heating canned foods do have certain disadvantages.

One disadvantage resides in the fact that the devices usually do not lend themselves to heating foods other than canned foods.

Another disadvantage resides in the fact that the heat-generating compound, such as unslaked lime, will not maintain a sufficiently high heat for a sufficient period of time to cook foods as distinguished from merely heating them in a sealed can.

A further disadvantage resides in the fact that the heat generated by the compound is rapidly dissipated.

In view of the foregoing factors and conditions characteristic of devices for heating canned foods, it is a primary object of the present invention to provide a new and useful flameless cooking apparatus and compound not subject to the disadvantages enumerated above and having a liquid-actuated, heat-generating compound especially designed for cooking foods efficiently, safely and expeditiously.

Another object of the present invention is to provide a new and useful flameless cooking apparatus.

Yet another object of the present invention is to provide a new and useful liquid-actuated, heat-generating compound capable of generating a heat of over 300 degrees F. and maintaining the generated heat for a sufficient period of time to cook foods.

A further object of the present invention is to provide a new and useful container means for heating frozen foods chemically.

A still further object of the present invention is to provide a new and useful container for liquid-actuated, heat-generating compounds.

According to the present invention, a flameless cooking apparatus is provided which comprises a container means having an open top, a closed bottom wall and an encompassing sidewall. A liquid dispensing means is mounted in the container and includes a liquid outlet for controlling the flow of a liquid, such as water, from the dispensing means. A liquid-actuated, heat-generating compound of the present invention may be placed in the container on the closed bottom wall and covered with an absorbent material, such as a blotter, which is placed in fluid communication with the liquid dispensing means to receive the water dispensed therefrom. The water from the blotter than saturates the heat-generating compound so that it will give off sufficient heat to cook foods placed in the container means.

Suitable closure means is affixed to the container on the exterior thereof for sealing the container during the cooking operation. The container is especially adapted for heating frozen foods. The frozen food in its conventional package may be placed in the open top of the container means and covered with the closure means. The liquid dispensing means may then be caused to dispense water onto the blotter by pulling a draw string which opens the liquid outlet to permit the water to flow therefrom. The heat-generating compound of the present invention not only produces a high heat when it is first energized by the water, but maintains a high temperature for a sufficient period of time to either cook foods or heat frozen foods. Sodium hydroxide is employed in the compound for producing a high initial heat and gravel is employed in the compound for maintaining a high level of heat imparted thereto when the sodium hydroxide and other ingredients of the compound, to be hereinafter described in detail, are first energized with the water.

The heat-generating compound is packaged in a special container of the present invention which includes an aluminum-foil housing. An absorbent pad is placed on the material in the aluminum-foil housing after which a perforated aluminum-foil partition is placed on top of the absorbent pad and sealed to the aluminum housing portion. An aluminum-foil cover, which is provided with a pull-tab, is then sealed to the open top of the housing above the perforated partition so that a water-tight package is thereby formed.

The heat-generating compound may then be used to cook foods by pulling the tab to peel off the aluminum-foil cover thus exposing the perforated partition. Water may then be poured into the container on top of the perforated partition which distributes it uniformly over the absorbent pad which, in turn, saturates the heat-generating compound uniformly. In addition, the absorbent pad prevents the activated, bubbling material from rising up out of the foil container.

The features of the present invention which are believed to be novel are set forth with particularity in the appended claims. The present invention, both as to its organization and manner of operation, together with further objects and advantages thereof, may best be understood by reference to the following description taken in connection with the accompanying drawings in which like reference characters refer to like elements in the several views.

In the drawings:

FIGURE 1 is a perspective view of a cooking apparatus and compound of the present invention;

FIGURE 2 is an enlarged, partial cross-sectional view taken along line 2—2 of FIGURE 1;

FIGURE 3 is a plan view of a plurality of packages of the heat-generating compound of the present invention;

FIGURE 4 is an enlarged, partial cross-sectional view taken along line 4—4 of FIGURE 3; and FIGURE 5 is an enlarged perspective view of one of the packages of FIGURE 3 with parts broken away to show internal construction.

Referring again to the drawings and particularly to FIGURES 1 and 2, a flameless cooking apparatus constituting a presently preferred embodiment of the invention, generally designated 10, includes a container 12 having a closed bottom wall 14, end walls 16 and side walls 18. The ends walls 16 and the side walls 18 slope upwardly and outwardly from the bottom wall 14 thereby forming an open top 20 through which a plurality of liquid-actuated, heat-generating pads or containers 22 may be inserted and placed in position on the bottom wall 14. The pads 22 may contain any suitable heat-generating chemical for heating foods in the container 12. Preferably however, the pads 22 are filled with a liquid-actuated, heat-generated compound of the present invention, to be presently described. A liquid dispensing means 24 may also be placed on the bottom wall 14 adjacent one end wall 16 for dispensing a suitable liquid, such as water, onto the pads 22. Flow of the water from the dispenser 24 is controlled by a normally closed valve 26 which is mounted in a liquid outlet 28 and which is normally maintained in a closed position by a spring member 30. The valve 26 may be unseated to permit flow of water from the dispenser 24 by pulling a draw string 32 which is connected to the valve 26 and extends out through one of the side walls 18. The draw string 32 is maintained in sealed relation with the side wall 18 by a suitable sealing ring 34 and carries a ring member 36 at its free end 38.

An absorbent pad 40, such as blotting paper, is placed in the container means 12 on top of the pad 22 and in contact with the liquid dispensing means 24 to rapidly distribute water issuing therefrom over the pads 22. The water reacts exothermically with the chemical contained in the pads 22 to give off heat for cooking foods in the container means 12. This heat is retained within the container means 12 by suitable sealing means 42 which may conveniently take the form of a plurality of aluminum-foil end aprons 44 and side-aprons 46. Each apron 44 includes a narrow end 48 which is affixed to the lower edge of an associated end wall 16 and a wide end 50 which is wider than the side wall 16. Each side apron 46 includes a narrow end 52 which is secured to the lower edge of an associated side wall 18 and a wide end 54 which is wider than its associated side wall 18. The aprons 44 and 46 are each long enough to extend over the container means 12 covering the open top 22. Alternatively, the aprons 44 and 46 may be brought together above the container means 12 and sealed together in well known manner to retain the heat generated by the pad 22 within the container means 12.

The flameless cooking apparatus 10 may be conveniently employed to heat frozen food packages, such as the frozen food tray 56 which may be placed on top of the absorbent pad 40.

The flameless cooking apparatus 10 may be conveniently used for cooking foods of other types. For example, one apron 44 and one apron 46 may be brought across the open top 20 and placed over the absorbent pad 40 after which the folded aprons 44 and 46 may be sealed to the container means 12 in such a manner that the open top 20 is sealed to prevent fumes from the pads 22 from leaving the container means 12. A hamburger patty or other food item may then be placed on top of the folded-over aprons 44 and 46 and the remaining aprons 44 and 46 may be placed over the hamburger patty to retain the heat in the container 12.

Referring now to FIGURES 3–5, the chemical pads 22 may be supplied in a suitable package 60 wherein a plurality of pads 22 are separated from each other along perforated lines, as indicated at 62, so that individual packages or pads 22 may be readily separated from the package 60 and placed in the container 12. Each pad 22 preferably contains a new and useful composition of matter of the present invention, generally indicated at 64, to be hereinafter described in detail. The composition-of-matter of compound 64 may be placed in a suitable shell or housing 66 which may be conveniently made of aluminum foil and which includes a closed bottom wall 68 and upstanding side walls 70 forming an open top 72 which may be closed by a top wall 74 provided with a pull-tab 76 to facilitate tearing the top wall 74 away from the side walls 70 to expose the open top 72, as shown in FIGURE 5. When the top wall 74 is torn away as shown in FIGURE 5, it exposes a horizontal, perforated partition 78 which is mounted in the shell 66 above the compound 64. An absorbent pad 80 is placed in the shelf 66 on top of the compound 64 subjacent the partition 78 to distribute the liquid which activates the compound 64 as it filters through the perforations 82 contained in the partition 78. The absorbent pad 80 not only uniformly distributes the liquid over the compound 64, but also prevents the compound 64 from rising up out of the shell 66 during its reaction with the liquid which causes it to bubble.

The compound 64 may be activated by a suitable liquid, such as water, and may include the following ingredients in the proportions indicated:

12–34 teaspoons of gravel having a grain size of about 1/32–1/8 inch.
2–3½ teaspoons of fine table salt.
¾–1½ teaspoons of copper sulphate.
5–7½ teaspoons of atomized aluminum (Alcoa grade No. 120).
8–24 teaspoons sodium hydroxide flakes.

For most satisfactory results, however, the following proportions may be used:

17 teaspoons of gravel.
3½ teaspoons of salt.
1½ teaspoons of copper sulphate.
7½ teaspoons of aluminum.
24 teaspoons of sodium hydroxide.

After the above ingredients have been thoroughly mixed in the preferred proportions, the mixture may be placed in the shells 66 to form the pads 22. It has been found that approximately 6–61½ ounces of compound 64 forms a pad 22 sufficient size for conveniently handling. Such a pad may be activated with approximately 2½–3 ounces of water and when so activated may be used in accordance with the following examples:

EXAMPLE I

Eight ounces of 68 degree F. tap water was placed in a ½ pint capacity metal can.

Three 6½ ounce packages of compound 64 were placed in a metal container 5½ inches high by 4 inches in diameter which was uninsulated. The container of tap water was then placed on top of the pads 22 which were activated with approximately 3½ ounces of water.

The temperature of the water increased from 68 degrees F. to 200 degrees F. in 11 minutes, rising imperceptibly but evenly to 204 degrees F. in 35 minutes.

The temperature of the activated compound 64 at the end of a 39-minute time interval was over 300 degrees F.

EXAMPLE II

Six and a half ounces of compound 64 was spread over the bottom of an aluminum tray which was approximately 11½ by 7½ by ⅞ inches in size. The compound 64 was activated with approximately 3 ounces of water and was covered with aluminum foil immediately after activation.

Two raw eggs were taken from the refrigerator and emptied onto an aluminum tray which was placed on top of the activated compound 64 and covered with aluminum foil. The eggs were thoroughly steamed in 10 minutes with the consistency of the whites being firm and the yokes being slightly better than medium.

The temperature under the foil cover adjacent the eggs was 189 degrees F. at 3 minutes, 203 degrees F. at 4 minutes, 209 degrees F. at 5 minutes, 216 degrees F. at 6 minutes and 210 degrees F. at 10 minutes.

The temperature of the compound 64 was 290 degrees F. at 22 minutes, but dropped to 240 degrees F. at 26 minutes because the foil covering was left open to determine heat dissipation of the mixture.

EXAMPLE III

Since one ounce frozen egg roll having a temperature of approximately 3 degrees below zero were placed in an aluminum tray measuring 11½ inches by 7½ inches by ⅞ inch. The egg rolls were wrapped in aluminum foil and placed in the tray side by side on top of 6½ ounces of compound 64 which had previously been spread on the bottom of the tray and covered with aluminum foil. After the compound 64 had been activated with approximately 3–3½ ounces of water, aluminum foil was loosely wrapped around the tray and its contents.

The temperature inside the egg rolls was approximately 160 degrees F. at 25 minutes and 168 degrees F. at 35 minutes. The temperature of the compound 64 was 270 degrees F. at 35 minutes.

EXAMPLE IV

Six and a half ounces of compound 64 was spread over the bottom of an aluminum tray measuring 11½ inches by 7½ inches by ⅞ inch. The compound 64 was activated with approximately 3 ounces of water and covered with aluminum foil. Three 3-ounce frozen chuck patties having a temperature of approximately 3 degrees below zero were then wrapped in aluminum foil and placed on top of the activated compound. In twenty-five minutes the patties were cooked to medium doneness with an inside temperature of approximately 170 degrees F. In 35 minutes the patties were well done having an inside temperature of approximately 168 degrees F. The temperature of the compound 64 was over 270 degrees F. in 35 minutes.

EXAMPLE V

Six and a half ounces of compound 64 was placed in the tray of the preceding example and covered with foil and activated with 3 ounces of water. A frozen cube steak was wrapped in aluminum foil and placed on top of the activated mixture. The pan was then wrapped loosely in aluminum foil with the edges of the foil being tucked in firmly. The inside temperature of the meat was 135 degrees F. in 15 minutes, 156 degrees F. in 20 minutes, 180 degrees F. in 25 minutes and after 30 minutes, the steak was well done having an internal temperature of 164 degrees F. The temperature of compound 64 at 35 minutes was 270 degrees F.

EXAMPLE VI

Six and a half ounces of compound 64 was spread on the bottom of the aluminum pan used in the preceding examples. A 10-ounce, frozen ham dinner containing a slice of ham, a portion of whipped sweet potatoes, a portion of peas and carrots, and raisin sauce was placed in the open top of the aluminum pan after the compound had been activated with 3–3½ ounces of water and the package formed thereby was covered with aluminum foil.

The internal temperature of the food was 195 degrees F. after 35 minutes of time. The temperature of compound 64 was 270 degrees F. at 37 minutes.

Experiments indicated that if the gravel exceeds the sodium hydroxide in the compound 64 a high, early heat is obtained, but it drops off too soon. It was also found that if sand is used instead of gravel, the heat flashes through the sand and is not retained sufficiently long to satisfactorily cook frozen dinners and the like. The sodium hydroxide when used with gravel produces a high early heat which is retained by the gravel. The food which is cooked by the compound 64 must be completely sealed in aluminum foil or the like so that the chemical formed by the compound 64 will not contact the food.

Experiments were also conducted with a compound which did not contain copper sulphate. It was found that this compound, while generally satisfactory, did not produce a constant temperature for as long a time as was obtained when the copper sulphate was added to the compound. The copper sulphate seems to assure that the compound will continue producing heat as the water is distributed thereover by the absorbent pad so that it will hold a high heat longer than when the copper sulphate is not used.

While the particular flameless cooking apparatus and compound hereinbefore shown and described in detail is fully capable of attaining the objects and providing the advantages hereinbefore stated, it is to be understood that they are merely illustrative of the presently preferred embodiments of the invention and that no limitations are intended to the details of construction, design or method steps herein shown and described other than as defined in the appended claims.

What is claimed is:

1. A liquid-actuated, heat-generating compound, comprising:

17 parts by volume of gravel having a grain size of approximately 1/32 inch;
3½ parts by volume of fine table salt;
1½ parts by volume of copper sulphate;
7½ parts by volume of atomized aluminum; and
24 parts by volume of sodium hydroxide.

2. A flameless cooking apparatus, comprising container means having an open top, a closed bottom wall and an encompassing side wall, liquid dispensing means mounted in said container means, said liquid dispensing means having a liquid outlet controlling the flow of liquid therefrom; and a liquid-actuated heat-generating compound mounted in said container means in communication with said liquid outlet, said compound heating said container when moistened with a liquid from said liquid dispensing means, and said liquid-actuated, heat-generating compound comprising 17 parts by volume of gravel; 3½ parts by volume of fine table salt; 1½ parts by volume of copper sulphate; 7½ parts by volume of aluminum; and 24 parts by volume of sodium hydroxide.

3. A liquid actuated heat generating compound comprising:

12–34 parts by volume of gravel having a grain size of about 1/32–⅛ inch;
8–24 parts by volume of a material which reacts exothermically with water; and
2–3½ parts by volume of fine table salt.

4. A liquid actuated heat-generating compound comprising:

12–34 parts by volume of gravel having a grain size of about 1/32–⅛ inch;
8–24 parts by volume of a material which reacts exothermically with water; and
¾–1½ parts by volume of copper sulphate.

References Cited by the Examiner
UNITED STATES PATENTS

| | | | |
|---|---|---|---|
| 1,497,970 | 6/1924 | Berkey | 126—263 |
| 1,812,243 | 6/1931 | Jost | 126—263 |
| 2,018,367 | 10/1935 | Lackenbach. | |
| 2,541,736 | 2/1951 | Alexander | 126—263 |
| 2,573,791 | 11/1951 | Howells. | |
| 2,850,006 | 9/1958 | Karpalo | 126—263 X |
| 3,079,911 | 3/1963 | Ryan et al. | 126—263 |

CHARLES J. MYHRE, *Primary Examiner.*